(12) United States Patent
Matsunaga et al.

(10) Patent No.: US 9,054,563 B2
(45) Date of Patent: Jun. 9, 2015

(54) MOTOR FOR ELECTRIC POWER STEERING DEVICE

(75) Inventors: Toshihiro Matsunaga, Chiyoda-ku (JP);
Yoshihito Asao, Chiyoda-ku (JP);
Satoru Akutsu, Chiyoda-ku (JP);
Kazuhisa Takashima, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 334 days.

(21) Appl. No.: 13/814,602

(22) PCT Filed: Feb. 9, 2011

(86) PCT No.: PCT/JP2011/052741
§ 371 (c)(1),
(2), (4) Date: Feb. 6, 2013

(87) PCT Pub. No.: WO2012/070255
PCT Pub. Date: May 31, 2012

(65) Prior Publication Data
US 2013/0140964 A1 Jun. 6, 2013

(30) Foreign Application Priority Data
Nov. 23, 2010 (JP) .................................. 2010-260709

(51) Int. Cl.
*H02K 5/16* (2006.01)
*B62D 5/04* (2006.01)
(Continued)

(52) U.S. Cl.
CPC .............. *H02K 5/161* (2013.01); *B62D 5/0403* (2013.01); *B62D 5/0406* (2013.01);
(Continued)

(58) Field of Classification Search
CPC ...................................................... H02K 5/161
USPC ..................................... 310/71, 68 B, 89–90
See application file for complete search history.

(56) References Cited

U.S. PATENT DOCUMENTS 6,388,351 B1 * 5/2002 Fisher et al. ..................... 310/91
6,713,915 B2 * 3/2004 Takahashi et al. .............. 310/89
(Continued)

FOREIGN PATENT DOCUMENTS

JP 9-65604 A 3/1997
JP 2002-345211 A 11/2002
(Continued)

OTHER PUBLICATIONS

International Search Report for PCT/JP2011/052741 dated Apr. 12, 2011.
(Continued)

*Primary Examiner* — Thanh Lam
(74) *Attorney, Agent, or Firm* — Sughrue Mion, PLLC; Richard C. Turner (57) ABSTRACT

A motor for an electric power steering device, includes: a housing side bearing which is placed on the output side of a shaft of a rotor placed in a frame, and is supported by a housing connected to the frame; and a frame side bearing which is placed on the opposite output side of the shaft of the rotor, and is composed of an outer ring and an inner ring supported by the frame. The motor is controlled by an electronic control unit which is coaxially placed with the rotor, the motor including: a bearing box which supports the frame side bearing, and is formed with a closed end section between the closed end section and the side of the frame side bearing; an axial elastic body which is placed on the closed end section of the bearing box, and applies a preload in an axial direction to the outer ring of the frame side bearing; and a radial elastic body which is placed on the outer circumferential side of the outer ring of the frame side bearing, and applies a preload in a direction perpendicular to the axial direction.

18 Claims, 6 Drawing Sheets

(51) Int. Cl.
  F16C 25/08    (2006.01)
  F16C 27/06    (2006.01)
  F16C 33/58    (2006.01)
  H02K 5/173    (2006.01)
  H02K 29/12    (2006.01)
  H02K 11/00    (2006.01)
  H02K 5/24     (2006.01)

(52) U.S. Cl.
  CPC ............ *F16C 25/083* (2013.01); *F16C 27/066* (2013.01); *F16C 33/586* (2013.01); *H02K 5/1732* (2013.01); *H02K 5/24* (2013.01); *H02K 29/12* (2013.01); *H02K 11/0031* (2013.01)

(56) References Cited

U.S. PATENT DOCUMENTS

| | | | |
|---|---|---|---|
| 2005/0116557 A1* | 6/2005 | Rojo Lulic | 310/67 R |
| 2005/0168085 A1* | 8/2005 | Ihata et al. | 310/90 |
| 2006/0038452 A1* | 2/2006 | Lesak | 310/90 |
| 2006/0082234 A1* | 4/2006 | Tsukamoto | 310/90 |
| 2007/0103019 A1* | 5/2007 | Nakano et al. | 310/90 |
| 2010/0314192 A1 | 12/2010 | Nagase et al. | |

FOREIGN PATENT DOCUMENTS

| | | |
|---|---|---|
| JP | 2002-359945 A | 12/2002 |
| JP | 2008-271747 A | 11/2008 |
| WO | 2009/101779 A1 | 8/2009 |
| WO | 2009/101779 A9 | 8/2009 |

OTHER PUBLICATIONS

Japanese Office Action, issued Oct. 8, 2013, Patent Application No. 2012-545625.

Communication dated Dec. 2, 2014, issued by the State Intellectual Property Office of the People's Republic of China in counterpart Application No. 201180046323.9.

* cited by examiner

MOTOR FOR ELECTRIC POWER STEERING DEVICE

CROSS REFERENCE TO RELATED APPLICATIONS

This application is a National Stage of International Application No. PCT/JP2011/052741 filed Feb. 9, 2011, claiming priority based on Japanese Patent Application No. 2010-260709 filed Nov. 23, 2010, the contents of all of which are incorporated herein by reference in their entirety.

TECHNICAL FIELD

The present invention relates to a motor for an electric power steering device including: a rotor which is placed in a frame, a first bearing which is placed on a shaft on the output side of a rotor and is supported by a housing connected to a frame, and a second bearing which is placed on the shaft on the opposite output side of the rotor and is composed of an outer ring and an inner ring supported by the frame; and the motor is controlled by an electronic control unit which is coaxially placed with the rotor.

BACKGROUND ART

As a conventional motor for an electric power steering device, there is known one in which a frame that contains a rotor is formed with a bearing concave portion for non-rotatably and axially movably containing an outer ring of a bearing that rotatably supports a shaft of the rotor, a wave washer is made to intervene between the bearing concave portion and the bearing, and a preload is applied to the outer ring of the bearing with the wave washer; and accordingly, vibration resistance is improved.

[Patent Document 1] Japanese Unexamined Patent Publication No. 2002-359945

DISCLOSURE OF THE INVENTION

Problems to be Solved by the Invention

In the aforementioned conventional motor for the electric power steering device, noise caused by each radial, circumferential, and axial vibration of the outer ring is suppressed by applying a preload in an axial direction (axial preload) to the outer ring of the bearing by the elastic force of the wave washer.

However, each radial, circumferential, and axial vibration of the outer ring increases by an increase of variation in axial dimension and a decrease in axial preload associated thereto caused by extension in the entire length of the motor due to a change in motor construction, an increase in output, and the like; and in the case of dealing with such increase of each vibration, it becomes a state where noise suppression effect is considerably impaired by the axial preload by the wave washer.

The present invention has been made to solve the foregoing problem, and an object of the present invention is to provide a motor for an electric power steering device capable of suppressing noise caused by each radial, circumferential, and axial vibration of an outer ring of a bearing.

Means for Solving the Problems

According to the present invention, there is provided a motor for an electric power steering device, including: a rotor which is placed in a frame; a housing side bearing which is placed on the output side of a shaft of the rotor, and is supported by a housing connected to the frame; and a frame side bearing which is placed on the opposite output side of the shaft of the rotor, and is composed of an outer ring and an inner ring supported by the frame. The motor is controlled by an electronic control unit which is coaxially placed with the rotor on the output side of the shaft of the rotor, the motor including: a bearing box which supports the frame side bearing, and is formed with a closed end section having an air gap between the closed end section and the side of the frame side bearing; an axial elastic body which is placed on the closed end section of the bearing box, and applies a preload in an axial direction to the outer ring of the frame side bearing; and a radial elastic body which is placed on the outer circumferential side of the outer ring of the frame side bearing, and applies a preload in a direction perpendicular to the axial direction.

Furthermore, according to the present invention, there is provided a motor for an electric power steering device, including: a rotor which is placed in a frame; a housing side bearing which is placed on the output side of a shaft of the rotor, and is supported by a housing connected to the frame; and a frame side bearing which is placed on the opposite output side of the shaft of the rotor, and is composed of an outer ring and an inner ring supported by the frame. The motor is controlled by an electronic control unit which is coaxially placed with the rotor on the opposite output side of the shaft of the rotor, the motor including: a bearing box which supports the frame side bearing, and is formed with a closed end section having an air gap between the closed end section and the side of the frame side bearing; an axial elastic body which is placed on the closed end section of the bearing box, and applies a preload in an axial direction to the outer ring of the frame side bearing; and a radial elastic body which is placed on the outer circumferential side of the outer ring of the frame side bearing, and applies a preload in a direction perpendicular to the axial direction.

Advantageous Effect of the Invention

According to a motor for an electric power steering device of the present invention, the motor includes: an axial elastic body which applies a preload in an axial direction to an outer ring of a frame side bearing; and a radial elastic body which is placed on the outer circumferential side of the outer ring of the frame side bearing, and applies a preload in a direction perpendicular to the axial direction, whereby variation in axial dimension is absorbed and noise caused by each radial, circumferential, and axial vibration of the outer ring of the bearing can be suppressed.

MODE FOR CARRYING OUT THE INVENTION

Embodiment 1.

Figure 1:
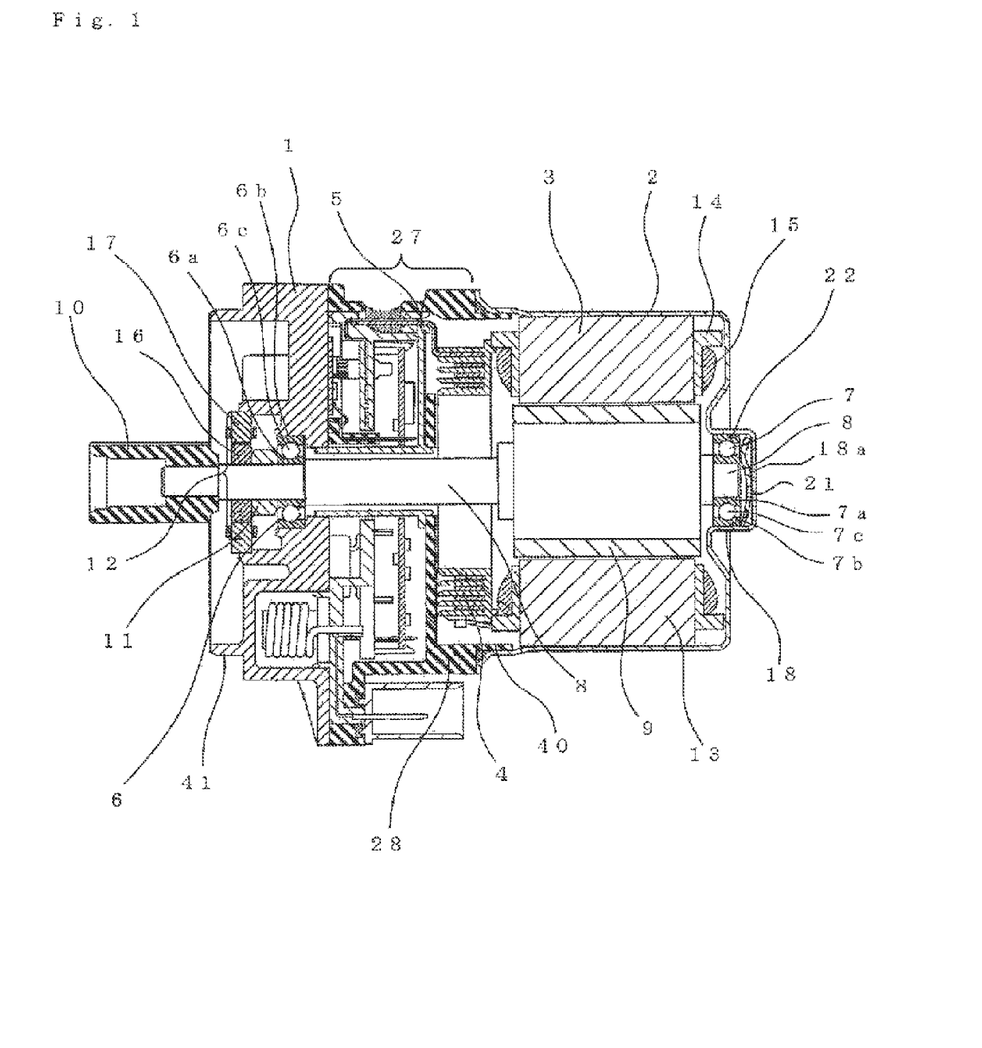
FIG. 1 is a cross-sectional view showing a motor for an electric power steering device according to Embodiment 1 of the present invention.

Hereinafter, Embodiment 1 of the present invention will be described with reference to FIG. 1; and, in each of the drawings, identical or equivalent members and portions will be described with the same reference numerals assigned thereto. FIG. 1 is a cross-sectional view showing a motor for an electric power steering device according to Embodiment 1 of the present invention.

FIG. 1 is the motor for the electric power steering device (hereinafter, referred to as abbreviated as "motor") according to Embodiment 1 of the present invention. In the motor, a housing 1 made of a material such as aluminum, an electronic control unit (hereinafter, referred to as "ECU") 27 which controls the motor, and a cylindrically shaped frame 2 are fixed by screws (not shown in the drawing), respectively. Then, a stator 3 fixed to the inner wall surface of the frame 2 and a holder 4 fixed to the one lateral side of the stator 3 are included.

In addition, terminals 5 retained by the holder 4 are connected to a power source supply unit (not shown in the drawing).

Furthermore, a shaft 8 which is disposed on a central axis line of a case composed of the housing 1 and the frame 2 and is rotatably and removably supported by a housing side bearing 6 and a frame side bearing 7; a rotor 9 in which an N pole magnet and an S pole magnet are alternately bonded to the shaft 8 and a protective tube is coated on the outer surface thereof; a boss 10 which is press-fitted to an end of the shaft 8 and is connected to a steering mechanism (not shown in the drawing); and a resolver 12 serving as a rotational position detection device which is provided between the boss 10 and a bush 11 press-fitted to the shaft 8 and detects a rotational angle of the shaft 8, are included.

The housing side bearing 6 is positioned on the output side of the shaft 8 of the rotor 9 and the frame side bearing 7 is positioned on the opposite output side of the shaft 8 of the rotor 9.

The ECU 27 is coaxially placed with the shaft 8 of the rotor 9; and the drawing shows a case where the ECU 27 is placed on the output side of the shaft 8 of the rotor 9, that is, between the housing 1 and the frame 2, as an example. The ECU 27 is disposed in an ECU case 28 made of a material such as aluminum; the ECU case 28 is formed with a frame side fitting portion 40 to be fitted into the frame 2 on one end portion thereof; and the housing 1 disposed on the other end portion of the ECU case 28 is formed with a gear side fitting portion 41 to be fitted to a housing on the steering gear side (not shown in the drawing).

The stator 3 includes: a core 13 in which silicon steel are laminated and axially extended slots (not shown in the drawing) are formed at circumferentially spaced intervals; and a motor coil 15 which is configured by winding a wire on the slots of the core 13 via insulators 14. A U-phase coil portion, a V-phase coil portion, and a W-phase coil portion of the motor coil 15 have a structure connected in delta.

The stator 3 is press-fitted in a cup-shaped frame 2 manufactured by drawing an iron plate. The frame 2 is formed with a bearing box 18 which contains and supports the frame side bearing 7 and is formed with a closed end section 18a having an air gap between the closed end section and the side of the frame side bearing 7. Furthermore, the frame 2 is formed with holes (not shown in the drawing) for use in fitting the ECU case 28 into the frame 2. The holes are provided with rubber caps (not shown in the drawing) for ensuring waterproof of the motor.

The resolver 12 includes a resolver rotor 16 press-fitted to the shaft 8 and a resolver stator 17 surrounding the resolver rotor 16.

The housing side bearing 6 is a rolling bearing composed of an inner ring 6a, an outer ring 6b, and balls 6c; the inner ring 6a is press-fitted and fixed to the shaft 8; and the outer ring 6b is fixed to the housing 1 by caulking. The frame side bearing 7 is a rolling bearing composed of an inner ring 7a, an outer ring 7b, and balls 7c; the inner ring 7a is press-fitted and fixed to the shaft 8; and the outer ring 7b is fitted in the bearing box 18 in a clearance fit (a clearance fit is an assembly where a part enters a matching hole with a slightly larger diameter for easy joining or easy removal).

An axial elastic body 21 which is for applying a preload in an axial direction (axial preload) of the shaft 8 of the rotor 9 is provided in the air gap between the frame side bearing 7 and the bottom of the closed end section 18a of the bearing box 18. A radial elastic body 22 which is for applying a preload in a direction perpendicular to the axial direction of the shaft 8 of the rotor 9, that is, a preload in a radial direction (radial preload) is provided between the outer circumferential side of the frame side bearing 7, that is, the outer circumferential surface of the outer ring 7b of the frame side bearing 7 and the side of the bearing box 18 which faces the outer circumferential side of the frame side bearing 7, that is, the outer circumferential surface of the outer ring 7b of the frame side bearing 7.

The outer ring 7b of the frame side bearing 7 is fitted in the bearing box 18 in a clearance fit; and therefore, a minute clearance exists. When the motor rotates, a radial excitation force is generated by a gap between the axis center of the shaft 8 of the rotor 9 and the gravity center of the magnets attached to the surface of the rotor 9 and by an imbalance in magnetic force between the stator 3 and the rotor 9.

The radial excitation force causes the run-out of the rotor 9 to move the frame side bearing 7 inside the bearing box 18; and accordingly, a collision occurs between the outer ring 7b of the frame side bearing 7 and the bearing box 18, between the outer ring 7b of the frame side bearing 7 and the balls 7c in the frame side bearing 7, and between the balls 7c and the inner ring 7a of the frame side bearing 7; so that vibration and noise are generated by a shock due to the collision.

Furthermore, the ECU 27 is disposed on the output side of the shaft 8 of the rotor 9, that is, between the housing 1 and the frame 2; and accordingly, variation in axial tolerance becomes large and clearance between the frame side bearing 7 and the bearing box 18 is likely to be fluctuated. This causes that the aforementioned vibration and noise are likely to be further increased.

As shown in FIG. 1, the axial elastic body 21 is located in the air gap between the frame side bearing 7 and the bottom of the closed end section 18a of the bearing box 18; and accordingly, variation due to axial dimensional tolerance can be absorbed and the axial preload can be applied to the outer ring 7b of the frame side bearing 7. The axial preload is applied to the outer ring 7b of the frame side bearing 7; and accordingly, there can be obtained effects in which the outer ring 7b of the frame side bearing 7 can be constrained, the collision against the balls 7c of the frame side bearing 7 can be suppressed, and the vibration and noise can be suppressed.

However, although variation in axial tolerance is absorbed and thus the axial preload is likely to be decreased, the radial elastic body 22 is located between the outer circumferential surface of the outer ring 7b of the frame side bearing 7 and the side of the bearing box 18 which faces the outer circumferential surface of the outer ring 7b of the frame side bearing 7; and accordingly, there can be obtained effects in which direct collision between the outer ring 7b of the frame side bearing 7 and the bearing box 18 can be suppressed and the vibration and noise are suppressed.

The aforementioned axial elastic body 21 and the radial elastic body 22 are combined and used. Accordingly, there can be obtained effects in which variation in axial dimension is absorbed; three collisions, which cause the vibration and noise, between the outer ring 7b of the frame side bearing 7 and the bearing box 18, between the outer ring 7b of the frame side bearing 7 and the balls 7c of the frame side bearing 7, and between the balls 7c and the inner ring 7a of the frame side bearing 7 can be simultaneously suppressed; and the vibration and noise can be considerably suppressed.

Embodiment 2.

Figure 2:
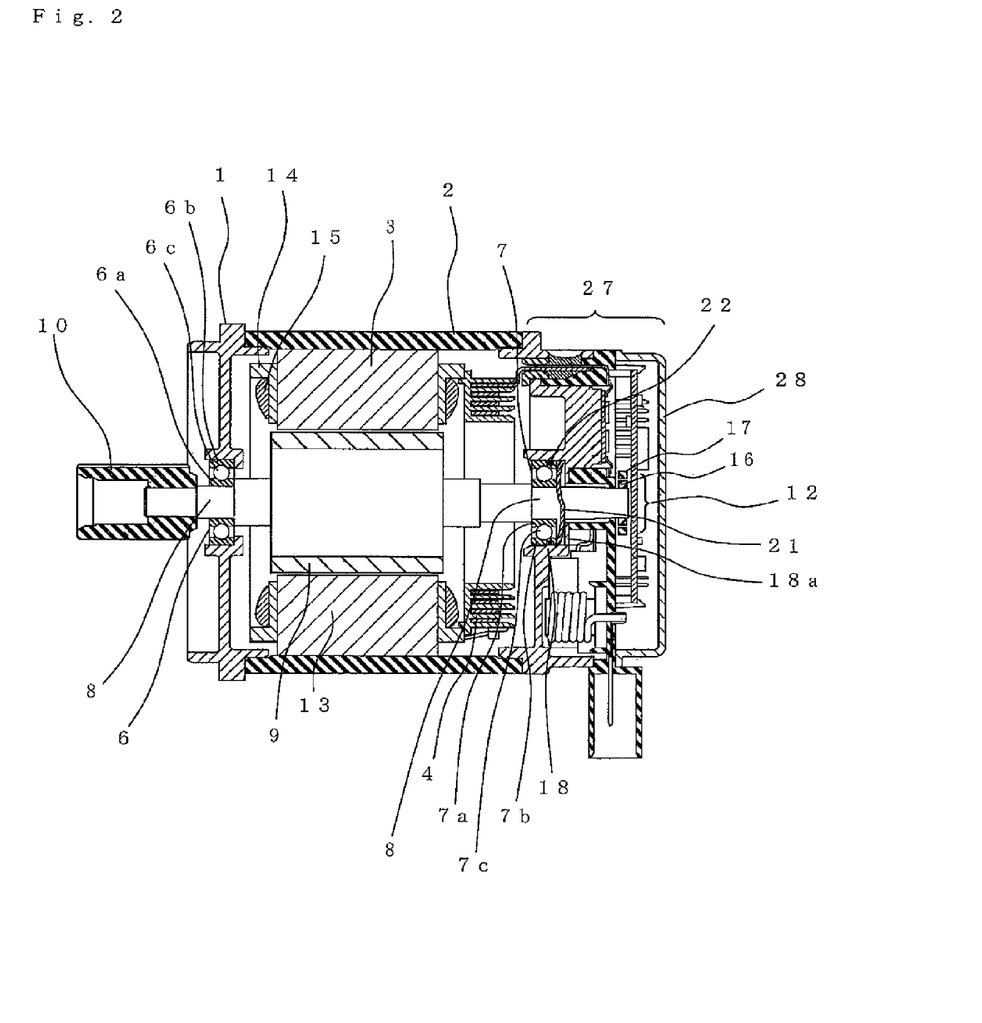
FIG. 2 is a cross-sectional view showing a motor for an electric power steering device according to Embodiment 2 of the present invention.
Figure 3:
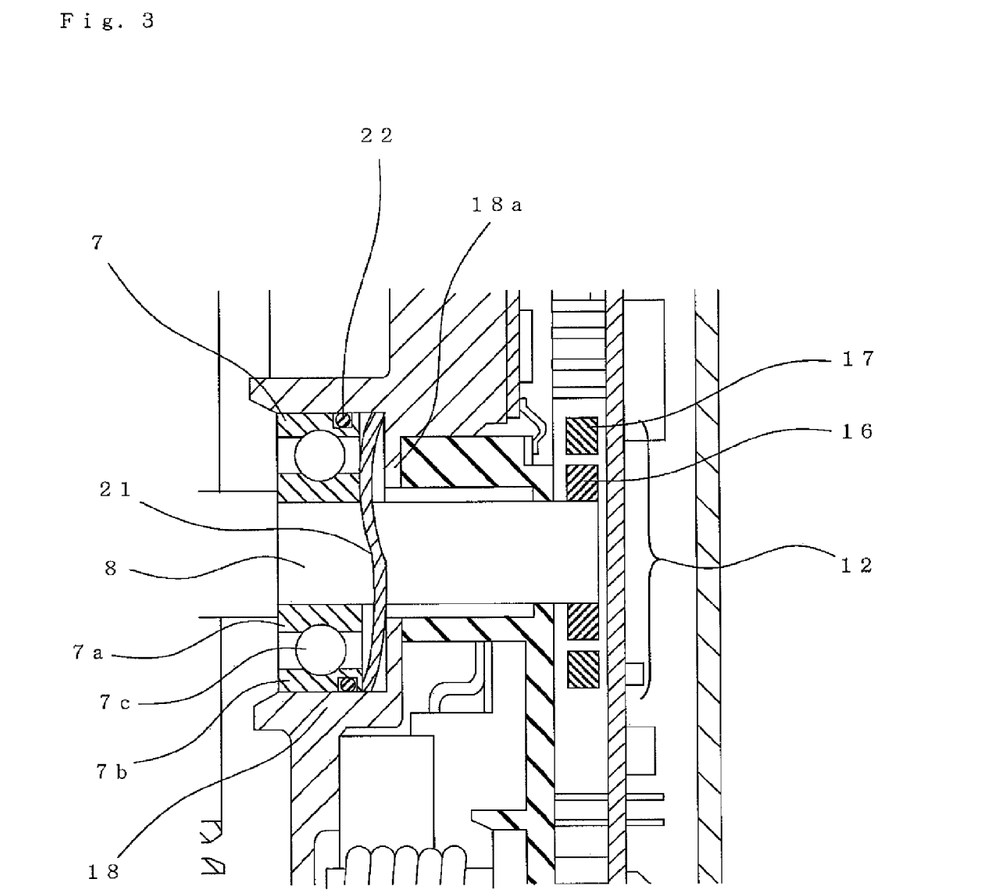
FIG. 3 is a cross-sectional view showing a structure around a frame side bearing and a resolver in the motor for the electric power steering device according to Embodiment 2 of the present invention.

Embodiment 2 of the present invention will be described with reference to FIG. 2 and FIG. 3. FIG. 2 is a cross-sectional view showing a motor for an electric power steering device according to Embodiment 2 of the present invention. FIG. 3 is a cross-sectional view showing a structure around a frame side bearing and a resolver in the motor for the electric power steering device according to Embodiment 2 of the present invention.

In these respective drawings, a housing 1 made of a material such as aluminum, a cylindrically shaped frame 2 in which a peripheral portion is fixed to the housing 1 with screws (not shown in the drawing), a stator 3 fixed to the inner wall surface of the frame 2, and a holder 4 fixed to the one lateral side of the stator 3, are included.

An ECU 27 which performs driving control of the motor is disposed on the opposite output side of a shaft 8 of a rotor 9 by being fixed to the frame 2 with screws (not shown in the drawing). Furthermore, the shaft 8 is disposed on the central axis line of a case composed of the housing 1 and an ECU case 28 and is rotatably and removably supported by a housing side bearing 6 and a frame side bearing 7.

The housing side bearing 6 is positioned on the output side of the shaft 8 of the rotor 9, whereas the frame side bearing 7 is positioned on the opposite output side of the shaft 8 of the rotor 9. Furthermore, a resolver 12 is structured to be disposed on the back of the frame side bearing 7.

As in the case where the ECU 27 is disposed on the output side of the shaft 8 of the rotor 9 as described in Embodiment 1, even when the ECU 27 is disposed on the opposite output side of the shaft 8 of the rotor 9 as shown in FIG. 2, vibration and noise due to collisions between an outer ring 7b of the frame side bearing 7 and a bearing box 18, between the outer ring 7b of the frame side bearing 7 and balls 7c of the frame side bearing 7, and between the balls 7c and an inner ring 7a of the frame side bearing 7 are generated by a radial excitation force; and vibration and noise due to the influence of variation in dimensional tolerance caused by extending axial dimension are likely to be further increased.

However, also in Embodiment 2, as in the aforementioned Embodiment 1, an axial elastic body 21 is located in an air gap between the frame side bearing 7 and the bottom of a closed end section 18a of the bearing box 18 and a radial elastic body 22 is located between the outer circumferential surface of the outer ring 7b of the frame side bearing 7 and the side of the bearing box 18 which faces the outer circumferential surface of the outer ring 7b of the frame side bearing 7. Accordingly, there can be obtained effects in which variation in axial dimension is absorbed; three collisions, which cause vibration and noise, between the outer ring 7b of the frame side bearing 7 and the bearing box 18, between the outer ring 7b of the frame side bearing 7 and the balls 7c of the frame side bearing 7, and between the balls 7c and the inner ring 7a of the frame side bearing 7 can be simultaneously suppressed and the vibration; and noise can be considerably suppressed.

FIG. 3 is the cross-sectional view showing the structure around the frame side bearing and the resolver according to Embodiment 2. As described above, when the ECU 27 is disposed on the opposite output side of the shaft 8 of the rotor 9, it turns out that the distance between the resolver 12 serving as a rotational position detection device which detects a rotational angle of the shaft 8 and the frame side bearing 7 considerably comes close as compared to the aforementioned Embodiment 1. In this case, the vibration of the frame side bearing 7 is transmitted to the resolver 12 and thus the generation of an error in the detection accuracy of a rotational position is conceivable.

Accordingly, vibration can be suppressed by locating the axial elastic body 21 and the radial elastic body 22 for the frame side bearing 7; and therefore, the vibration to be transmitted to the resolver 12 can also be suppressed. Incidentally, similar effects can also be expected for the arrangement configuration of the resolver 12 in Embodiment 1.

The axial elastic body 21 in the aforementioned both embodiments 1 and 2 applies the axial preload to the outer ring 7b of the frame side bearing 7 by compressing between the frame side bearing 7 and the bottom of the closed end section 18a of the bearing box 18; and therefore, for example, a wave washer, a coned disc spring, a plate spring, and the like can be used. The design of the axial preload can be easily performed by changing spring materials and/or by changing shapes.

Embodiment 3.

Figure 4:
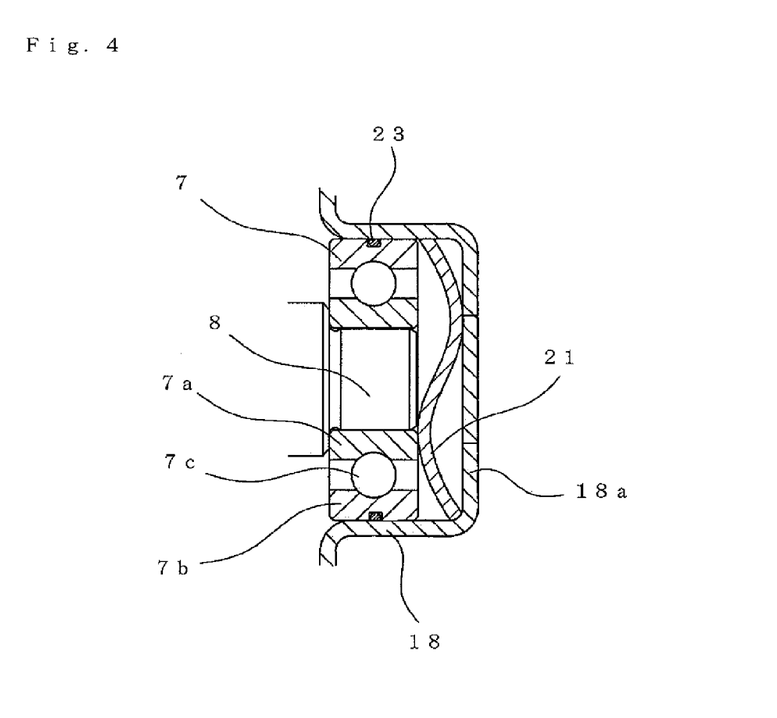
FIG. 4 is a cross-sectional view showing a radial elastic body made by an O-ring in a motor for an electric power steering device according to Embodiment 3 of the present invention.

Embodiment 3 of the present invention will be described with reference to FIG. 4. FIG. 4 is a cross-sectional view showing a radial elastic body made by an O-ring in a motor for an electric power steering device according to Embodiment 3 of the present invention.

As for a radial elastic body 23 in Embodiment 3, a soft material (a material with low elasticity) is suitable, for example, the radial elastic body 23 is formed of a rubber material and a resin material.

For example, if a groove is formed on the outer circumferential surface of an outer ring 7b of a frame side bearing 7 and the frame side bearing 7 previously integrated with a radial elastic body 23 made by an O-ring is used, the frame side bearing 7 and the radial elastic body 23 do not need to be separately assembled in assembling; and accordingly, assembling performance can be improved and a collision suppression effect can be obtained.

Furthermore, adjustment of a suitable radial preload can be easily performed by changing the material of the O-ring serving as the radial elastic body 23.

Embodiment 4.

Figure 5:
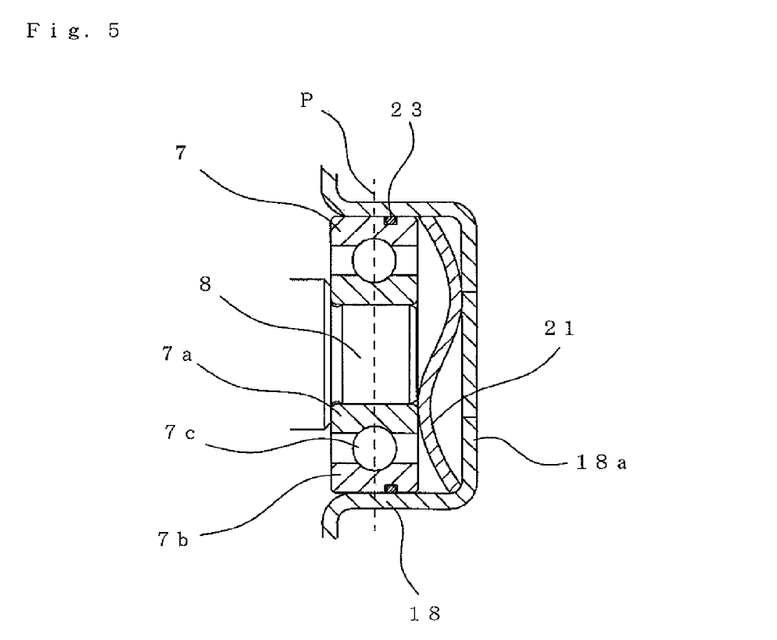
FIG. 5 is a cross-sectional view showing an arrangement of a radial elastic body in a motor for an electric power steering device according to Embodiment 4 of the present invention.

Embodiment 4 of the present invention will be described with reference to FIG. 5. FIG. 5 is a cross-sectional view showing a radial elastic body in a motor for an electric power steering device according to Embodiment 4 of the present invention.

An axial elastic body 21 has both effects, one is to suppress collisions between an outer ring 7b of a frame side bearing 7 and balls 7c of the frame side bearing 7 and between the balls 7c and an inner ring 7a of the frame side bearing 7 and the other is to apply a retention force to the frame side bearing 7 by the moment generated with respect to the frame side bearing 7 by applying an axial preload to the outer ring 7b of the frame side bearing 7. As for a radial retention force of the frame side bearing 7 by the axial preload received from the axial elastic body 21, the distance from a load generation point is short at the back of the frame side bearing 7 and therefore the retention force by the moment becomes small.

On the other hand, the distance from the load generation point is long at the front of the frame side bearing 7 and therefore it becomes easy to receive the retention force by the moment.

As shown in FIG. 5, a radial elastic body 23 to be attached to the frame side bearing 7 is disposed closer to the closed end section 18a side of a bearing box 18 than a central position P of the frame side bearing 7; and accordingly, there can be obtained an effect which efficiently assists a force that is small in the radial retention force of the frame side bearing 7 by the axial preload received from the axial elastic body 21.

By the way, the description has been made on the case where the radial elastic body 23 is formed by the O-ring in the aforementioned embodiments; however, similar effects can be obtained by other than the O-ring. Therefore, it is also naturally possible that the radial elastic body 23 is not integrated with the frame side bearing 7, but is configured by a different member.

Embodiment 5.

Figure 6:
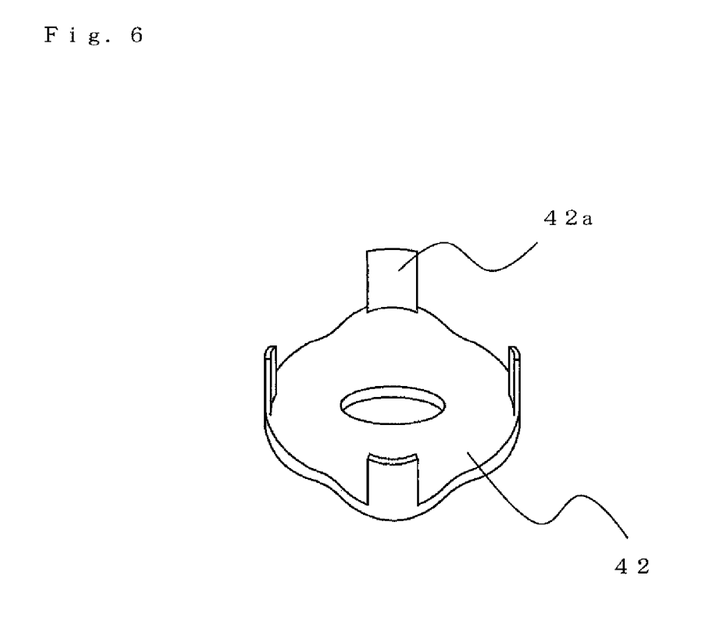
FIG. 6 is a perspective view showing an elastic body in a motor for an electric power steering device according to Embodiment 5 of the present invention.

Embodiment 5 of the present invention will be described with reference to FIG. 6. FIG. 6 is a perspective view showing an elastic body in a motor for an electric power steering device according to Embodiment 5 of the present invention.

In the aforementioned Embodiment 1 to Embodiment 4, the description has been made on the embodiments in which the axial elastic body 21 and the radial elastic body 22, 23 are regarded as different members; however, if an elastic body 42 shown in FIG. 6 is used, the axial preload and the radial preload can be applied by one member. The elastic body 42 is of a configuration in which a plurality of claws 42a are attached to a wave washer for use in the axial elastic body 21. These claws 42a are inserted between a frame 2 and a frame side bearing 7 to serve as a radial elastic body.

This configuration can integrally assemble in a state where the frame side bearing 7 is retained by the claws 42a of the elastic body 42 before assembling the frame side bearing 7 on the frame 2, thus resulting in an improvement in assembling performance.

Furthermore, after assembling, the claws 42a serve as the radial elastic body; and therefore, the axial preload and the radial preload can be applied by one member. In addition, the claws 42a are retained by being sandwiched between a bearing box 18 and the frame side bearing 7; however, a wave washer portion that applies the axial preload via the claws 42a can also be simultaneously retained and therefore there can be obtained an effect which prevents positional deviation of the wave washer.

Embodiment 6.

Figure 7:
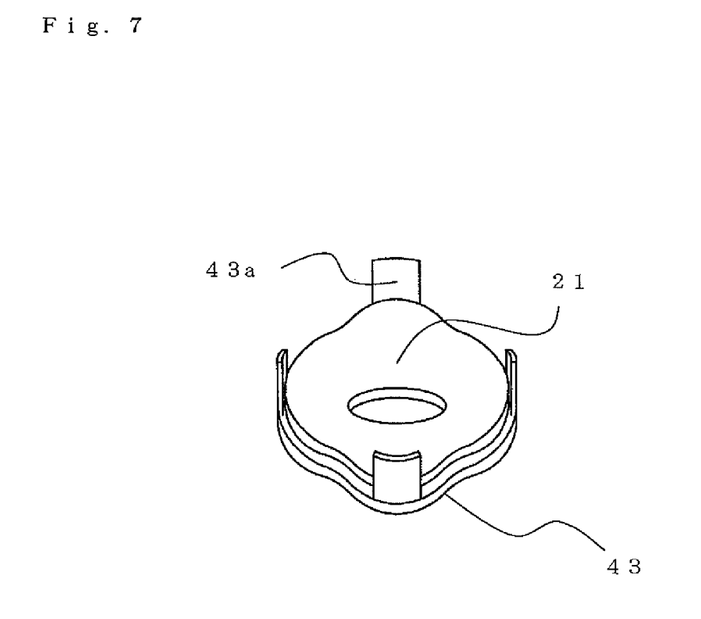
FIG. 7 is a perspective view showing an elastic body in a motor for an electric power steering device according to Embodiment 6 of the present invention.

Embodiment 6 of the present invention will be described with reference to FIG. 7. FIG. 7 is a perspective view showing an elastic body in a motor for an electric power steering device according to Embodiment 6 of the present invention.

FIG. 7 shows a configuration integrated by attaching a spacer 43 to a wave washer for use in an axial elastic body 21. The configuration is such that a plurality of claws 43a are attached to the spacer 43, and these claws 43a are inserted between a frame 2 and a frame side bearing 7 to serve as a radial elastic body. Incidentally, the spacer 43 is formed of resin such as polybutylene terephthalate (PBT) resin and nylon resin.

According to this configuration, the wave washer for use in the axial elastic body 21 is made to integrate with the spacer 43, resulting in an improvement in assembling performance similar to the aforementioned Embodiment 5. Furthermore, axial displacement can be adjusted by the height of the spacer 43 in addition to the natural length, thickness, and material of the axial elastic body 21; and therefore, the spacer 43 has an effect to improve setting flexibility in preload force. Furthermore, the claws 43a of the spacer 43 can obtain effects similar to the claws 42a of the elastic body 42 in Embodiment 5.

Embodiment 7.

Figure 8:
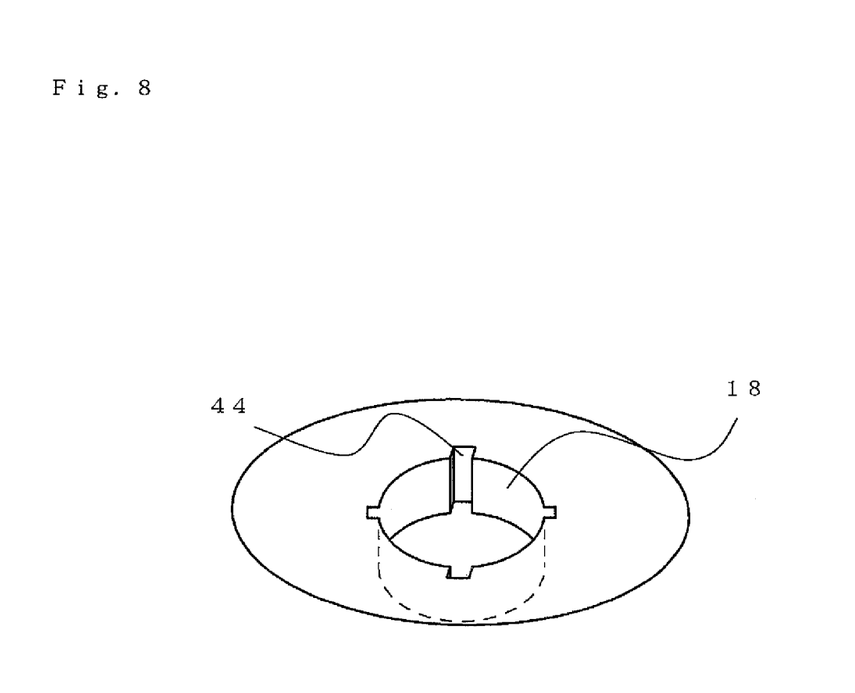
FIG. 8 is a perspective view showing an elastic body in a motor for an electric power steering device according to Embodiment 7 of the present invention.

Embodiment 7 of the present invention will be described with reference to FIG. 8. FIG. 8 is a perspective view showing an elastic body in a motor for an electric power steering device according to Embodiment 7 of the present invention.

FIG. 8 shows a configuration in which grooves 44 are formed on the surface of a frame 2 that retains a frame side bearing 7, that is, on the lateral side of a bearing box 18 corresponding to the positions of the claws 42a of the elastic body 42 or the claws 43a of the spacer 43 in the aforementioned Embodiment 5 or Embodiment 6.

By using this configuration, the elastic body 42 and the spacer 43 integrated with the axial elastic body 21 can be easily assembled to the frame 2 even when the claws 42a of the elastic body 42 or the claws 43a of the spacer 43 are attached. Furthermore, in the aforementioned configuration, the frame side bearing 7 is retained by the claws; however, the frame side bearing 7 can be retained by both of the lateral side of the bearing box 18 and the claws 42a of the elastic body 42 or the claws 43a of the spacer 43. As described above, the grooves 44 corresponding to the claws 42a of the elastic body 42 or the claws 43a of the spacer 43 are formed; and accordingly, the elastic body 42 or the spacer 43 is easily inserted. In addition, in the aforementioned configuration, the frame side bearing 7 is retained by the claws; however, the grooves 44 are formed and accordingly the frame side bearing 7 can be retained even by sections other than the claws.

INDUSTRIAL APPLICABILITY

The present invention is suitable to achieve a motor for an electric power steering device capable of suppressing noise caused by each radial, circumferential, and axial vibration of an outer ring of a bearing.

The invention claimed is:
1. A motor for an electric power steering device, comprising:
　a rotor which is placed in a frame;
　a housing side bearing which is placed on the output side of a shaft of said rotor, and is supported by a housing connected to said frame; and
　a frame side bearing which is placed on the opposite output side of said shaft of said rotor, and is composed of an outer ring and an inner ring supported by said frame,
　wherein said motor is controlled by an electronic control unit which is coaxially placed with said rotor on the output side of said shaft of said rotor, said motor including:

a bearing box which supports said frame side bearing, and is formed with a closed end section having an air gap between the closed end section and the side of said frame side bearing;

an axial elastic body which is placed on the closed end section of said bearing box, and applies a preload in an axial direction to said outer ring of said frame side bearing; and a radial elastic body which is placed on the outer circumferential side of said outer ring of said frame side bearing, and applies a preload in a direction perpendicular to the axial direction.

2. A motor for an electric power steering device, comprising:

a rotor which is placed in a frame;

a housing side bearing which is placed on the output side of a shaft of said rotor, and is supported by a housing connected to said frame; and a frame side bearing which is placed on the opposite output side of said shaft of said rotor, and is composed of an outer ring and an inner ring supported by said frame, wherein said motor is controlled by an electronic control unit which is coaxially placed with said rotor on the opposite output side of said shaft of said rotor, said motor including:

a bearing box which supports said frame side bearing, and is formed with a closed end section having an air gap between the closed end section and the side of said frame side bearing;

an axial elastic body which is placed on the closed end section of said bearing box, and applies a preload in an axial direction to said outer ring of said frame side bearing; and a radial elastic body which is placed on the outer circumferential side of said outer ring of said frame side bearing, and applies a preload in a direction perpendicular to the axial direction.

3. The motor for the electric power steering device according to claim 1, further comprising a resolver used as a rotational position detection device which detects a rotational angle of said shaft.

4. The motor for the electric power steering device according to claim 2, further comprising a resolver used as a rotational position detection device which detects a rotational angle of said shaft.

5. The motor for the electric power steering device according to claim 1, wherein said axial elastic body is made by a wave washer or a coned disc spring.

6. The motor for the electric power steering device according to claim 2, wherein said axial elastic body is made by a wave washer or a coned disc spring.

7. The motor for the electric power steering device according to claim 1, wherein said radial elastic body is made by an O-ring which is integrated with said outer ring of said frame side bearing.

8. The motor for the electric power steering device according to claim 2, wherein said radial elastic body is made by an O-ring which is integrated with said outer ring of said frame side bearing.

9. The motor for the electric power steering device according to claim 1, wherein said radial elastic body is disposed closer to the closed end section side of said bearing box than a central position of said frame side bearing.

10. The motor for the electric power steering device according to claim 2, wherein said radial elastic body is disposed closer to the closed end section side of said bearing box than a central position of said frame side bearing.

11. The motor for the electric power steering device according to claim 1, wherein said axial elastic body is provided with claws which serve as said radial elastic body by being inserted between said frame and said frame side bearing.

12. The motor for the electric power steering device according to claim 2, wherein said axial elastic body is provided with claws which serve as said radial elastic body by being inserted between said frame and said frame side bearing.

13. The motor for the electric power steering device according to claim 1, wherein said axial elastic body is provided with a spacer to which claws are attached, and said claws serve as said radial elastic body by being inserted between said frame and said frame side bearing.

14. The motor for the electric power steering device according to claim 2, wherein said axial elastic body is provided with a spacer to which claws are attached, and said claws serve as said radial elastic body by being inserted between said frame and said frame side bearing.

15. The motor for the electric power steering device according to claim 11, wherein the surface of said frame which retains said frame side bearing is formed with grooves corresponding to said claws.

16. The motor for the electric power steering device according to claim 12, wherein the surface of said frame which retains said frame side bearing is formed with grooves corresponding to said claws.

17. The motor for the electric power steering device according to claim 13, wherein the surface of said frame which retains said frame side bearing is formed with grooves corresponding to said claws.

18. The motor for the electric power steering device according to claim 14, wherein the surface of said frame which retains said frame side bearing is formed with grooves corresponding to said claws.

* * * * *